US012808975B2

(12) United States Patent
Layman et al.

(10) Patent No.: US 12,808,975 B2
(45) Date of Patent: Nov. 24, 2026

(54) SYSTEMS AND METHODS FOR MONITORING ATHLETIC EQUIPMENT

(71) Applicant: Real Time Sports LLC, Greenville, SC (US)

(72) Inventors: Timothy Barclay Layman, Greenville, SC (US); Earle Eugene Baillie, Greenville, SC (US)

(73) Assignee: Zero Replay, Inc., Woodruff, SC (US)

( * ) Notice: Subject to any disclaimer, the term of this patent is extended or adjusted under 35 U.S.C. 154(b) by 177 days.

(21) Appl. No.: 18/414,856

(22) Filed: Jan. 17, 2024

(65) Prior Publication Data

US 2024/0264266 A1 Aug. 8, 2024

Related U.S. Application Data

(60) Provisional application No. 63/483,159, filed on Feb. 3, 2023.

(51) Int. Cl.

| | |
|---|---|
| ***G01S 5/14*** | (2006.01) |
| ***A63B 43/00*** | (2006.01) |
| ***A63B 71/06*** | (2006.01) |

(52) U.S. Cl.

CPC ................ *G01S 5/14* (2013.01); *A63B 43/00* (2013.01); *A63B 71/0605* (2013.01); *A63B 2225/54* (2013.01); *G01S 2205/08* (2020.05)

(58) Field of Classification Search

CPC ........ G01S 5/14; G01S 2205/08; G01S 13/34; G01S 13/751; G01S 13/82; G01S 13/06;

(Continued)

(56) References Cited

U.S. PATENT DOCUMENTS

| | | | | |
|---|---|---|---|---|
| 1,121,707 A * | 12/1914 | Zimmerman et al. .. | B27B 25/04 144/242.1 |
| 7,071,825 B2 * | 7/2006 | VoBa ................. | G08B 13/2417 340/568.1 |

(Continued)

FOREIGN PATENT DOCUMENTS

| | | | |
|---|---|---|---|
| EP | 1724707 A2 * 11/2006 | ........... | H01Q 1/2208 |
| EP | 1706918 B1 * 11/2010 | ......... | G06K 7/10079 |

(Continued)

OTHER PUBLICATIONS

"International Search Report and Written Opinion, International Patent Application No. PCT/US2024/011788", Apr. 30, 2024.

(Continued)

*Primary Examiner* — Nuzhat Pervin
(74) *Attorney, Agent, or Firm* — Saul Ewing LLP; Brian R. Landry; Ian Mahany-Horton

(57) ABSTRACT

One aspect of the invention provides a system for monitoring athletic equipment. The system includes: a plurality of antennae positioned around edges of a field, wherein each antenna is configured and adapted to read radio frequency identifications (RFID) within a defined zone; an RFID tag attached to an article of athletic equipment; and a computer in communication with each antenna of the plurality of antennae. The computer is preprogramed with a database defining dimensions of the field. The computer is configured and adapted to process a signal from one or more antenna of the plurality of antenna in connection with the database to determine a position of the RFID tag.

18 Claims, 6 Drawing Sheets

(58) Field of Classification Search

CPC ... G01S 5/0027; A63B 43/00; A63B 71/0605; A63B 2225/54; A63B 24/0062; A63B 2220/833; G01V 3/08

USPC ........................................................ 342/458

See application file for complete search history.

(56) References Cited

U.S. PATENT DOCUMENTS

| | | | | | |
|---|---|---|---|---|---|
| 7,737,858 | B2 * | 6/2010 | Matityaho | H01Q 7/00 | 340/572.7 |
| 7,741,965 | B2 * | 6/2010 | Lai | H01Q 9/16 | 340/505 |
| 7,834,816 | B2 * | 11/2010 | Marino | G06K 7/10336 | 343/866 |
| 8,992,347 | B2 * | 3/2015 | Moran | A63B 24/0021 | 463/20 |
| 9,531,415 | B2 * | 12/2016 | Stelfox | A42B 3/30 | |
| 9,977,114 | B1 * | 5/2018 | Hebert | G01S 13/74 | |
| 10,799,785 | B2 * | 10/2020 | Baillie | A63B 71/0622 | |
| 10,817,833 | B2 * | 10/2020 | Matityaho | G06Q 10/08 | |
| 10,991,220 | B2 * | 4/2021 | Shakedd | G08B 13/2448 | |
| 11,000,751 | B1 * | 5/2021 | Baillie | A63B 43/004 | |
| 11,107,336 | B2 * | 8/2021 | Shakedd | G08B 13/2448 | |
| 11,156,693 | B2 * | 10/2021 | O'Hagan | G01S 5/0244 | |
| 11,253,767 | B2 * | 2/2022 | Kline | A63B 71/0619 | |
| 11,295,592 | B2 * | 4/2022 | Shakedd | G08B 13/2448 | |
| 11,497,964 | B1 * | 11/2022 | Hunter | A63B 24/0062 | |
| 11,951,373 | B2 * | 4/2024 | Spivak | A63B 71/0605 | |
| 2003/0174099 | A1 * | 9/2003 | Bauer | H01Q 1/2216 | 343/893 |
| 2005/0237194 | A1 * | 10/2005 | VoBa | G08B 13/2417 | 340/572.1 |
| 2006/0232382 | A1 * | 10/2006 | Bauer | H01Q 1/2216 | 340/10.1 |
| 2006/0238307 | A1 * | 10/2006 | Bauer | H01Q 1/2216 | 340/572.7 |
| 2006/0261938 | A1 * | 11/2006 | Lai | G06K 19/0723 | 340/505 |
| 2007/0257857 | A1 * | 11/2007 | Marino | G06K 7/10336 | 343/866 |
| 2008/0231456 | A1 * | 9/2008 | Matityaho | H01Q 1/2216 | 340/572.7 |
| 2008/0266092 | A1 * | 10/2008 | Campero | G06K 7/10316 | 340/572.1 |
| 2008/0283599 | A1 * | 11/2008 | Rasband | G06K 7/0008 | 235/439 |
| 2011/0199211 | A1 * | 8/2011 | Campero | G06K 7/0008 | 340/572.1 |
| 2012/0271440 | A1 * | 10/2012 | Lunner | A63B 24/0021 | 700/91 |
| 2013/0093591 | A1 * | 4/2013 | Campero | G06K 7/0008 | 340/572.1 |
| 2014/0194232 | A1 * | 7/2014 | Krysiak | A63B 41/085 | 473/570 |
| 2014/0221137 | A1 * | 8/2014 | Krysiak | G09B 19/0038 | 473/570 |
| 2018/0053143 | A1 * | 2/2018 | Matityaho | G06Q 10/08 | |
| 2018/0193694 | A1 * | 7/2018 | Bergman | A43B 3/38 | |
| 2020/0045932 | A1 * | 2/2020 | Knight | G01S 13/878 | |
| 2021/0020011 | A1 * | 1/2021 | Shakedd | G08B 13/2448 | |
| 2021/0027593 | A1 * | 1/2021 | Shakedd | G08B 13/2448 | |
| 2021/0027594 | A1 * | 1/2021 | Shakedd | G08B 13/2448 | |
| 2021/0034937 | A1 * | 2/2021 | Shakedd | G08B 13/2448 | |
| 2021/0146193 | A1 * | 5/2021 | Near | A63B 24/0021 | |
| 2021/0248027 | A1 * | 8/2021 | Alonso | G06F 11/0772 | |
| 2022/0284628 | A1 * | 9/2022 | Tuxen | A63B 71/0616 | |
| 2022/0314099 | A1 * | 10/2022 | Leech | A63B 24/0062 | |
| 2022/0387873 | A1 * | 12/2022 | Hall | A63B 71/0622 | |
| 2023/0048020 | A1 * | 2/2023 | Molyneux | A43B 1/0054 | |

FOREIGN PATENT DOCUMENTS

| | | | | | |
|---|---|---|---|---|---|
| EP | 3996288 | A1 * | 5/2022 | G06K 19/0672 | |
| WO | WO-2005013496 | A2 * | 2/2005 | G06K 7/10336 | |
| WO | WO-2005111959 | A2 * | 11/2005 | G01S 13/82 | |

OTHER PUBLICATIONS

YouTube, "SB100—How Tracking Technology Is Changing Football", https://www.youtube.com/watch?v=KdxJ8iKmNTA, downloaded Dec. 9, 2022.

YouTube, "What is RFID? How RFID works? RFID Explained in Detail", https://www.youtube.com/watch?v=Ukfpq71BoMo, downloaded Dec. 9, 2022.

* cited by examiner

SYSTEMS AND METHODS FOR MONITORING ATHLETIC EQUIPMENT

CROSS-REFERENCE TO RELATED APPLICATION

This application claims the benefit of priority to U.S. Provisional Patent Application Ser. No. 63/483,159, filed Feb. 3, 2023. The entire content of this application is hereby incorporated by reference herein.

BACKGROUND

Many sports such, as American football, have rules conditioned upon a ball reaching or not reaching a location, e.g., a plane such as a goal line, a first down, a side line, and the like. Despite tremendous fan interest and television coverage (including review of certain calls by video replay), detection of these events is still performed by sight and is subject to the limitations of camera placement, speed of play, and obscured line of sight (e.g., by other players on a running play into a goal-line stand).

SUMMARY OF THE INVENTION

One aspect of the invention provides a system for monitoring athletic equipment. The system includes: a plurality of antennae positioned around edges of a field, wherein each antenna is configured and adapted to read radio frequency identifications (RFID) within a defined zone; an RFID tag attached to an article of athletic equipment; and a computer in communication with each antenna of the plurality of antennae. The computer is preprogramed with a database defining dimensions of the field. The computer is configured and adapted to process a signal from one or more antenna of the plurality of antenna in connection with the database to determine a position of the RFID tag.

This aspect of the invention can have a variety of embodiments. The RFID tag is embedded within a sports ball. The sports ball can be a football. The RFID tag can be integrated into a stamped marking. The RFID tag can be integrated into an adhesive or paint prior to being integrated into the stamped marking.

The computer can be programmed to determine whether any portion of the football crosses a specified demarcation line. The computer can be programmed to receive geometric dimensions of the football and positional information of the RFID with respect to the geometric dimensions of the football.

The database can include a plurality of JSON objects derived from global positioning system (GPS) data of the field.

The system can further include a display including an event dashboard, wherein the computer is configured and adapted to collect and combine data from the plurality of antennae. The system can further include a plurality of remote computing devices attached to a fixed structure on the field. The plurality of remote computing devices can be in electronic communication with each of the plurality of antennae. The plurality of remote computing devices can be configurable to respond to an enrolled RFID tag.

The computer can be configured and adapted to determine an event. The computer is further configured to provide an output signal based on the event.

Another aspect of the invention provides a system for monitoring athletic equipment. The system includes: a plurality of antennae positioned around edges of a field, wherein each antenna is configured and adapted to read radio frequency identifications (RFID) within a defined zone; a plurality of RFID tags attached to a football, wherein the plurality of RFID tags are positioned along a plurality of outer dimensions of the football; and a computer in communication with each antenna of the plurality of antennae. The computer is preprogramed with a database including a plurality of data objects defining dimensions of the field. The computer is configured and adapted to process a signal from one or more antenna of the plurality of antenna in connection with the database to determine a position of the football.

This aspect of the invention can have a variety of embodiments. The plurality of RFID tags can include a primary RFID tag. The primary RFID tag can be located in a central location.

The plurality of RFID tags can include: a first RFID tag located at a first longitudinal end; a second RFID tag located at a second longitudinal end; and a subset of RFID tags located circumferentially around a central portion of the football.

The system can further include an electronic communication device including a display and a graphical user interface (GUI). The display and GUI can be configured and adapted to alert a user when a predefined event occurs. The computer and the electronic communication device can be configured to receive input from an electronically activated handheld whistle. The electronically activated handheld whistle can include a transmitter transmitting an electrically coded signal to start or stop a timekeeping clock and a receiver configured to receive a serialized pulse signal from the timekeeping clock. The handheld whistle can include a vane extending through the sidewall into the housing of the electronic whistle system. The vane can include a pivoting shaft and an optical sensor.

Another aspect of the invention provides a method of monitoring athletic equipment. The method includes: geomapping a plurality of dimensions of a field using a database including satellite information of the field; providing a plurality of antennae around a field, wherein a respective antenna is disposed on each of four pylons along goal lines of the field; providing an RFID tag to a ball; calculating a position of the RFID tag based upon a measured time for a signal to travel between the RFID tag and a respective antenna using trilateration; and converting the position to a location within a grid square along a model of a field.

Definitions

The present invention is most clearly understood with reference to the following definitions.

As used herein, the singular form "a," "an," and "the" include plural references unless the context clearly dictates otherwise.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used in the specification and claims, the terms "comprises," "comprising," "containing," "having," and the like can have the meaning ascribed to them in U.S. patent law and can mean "includes," "including," and the like.

Unless specifically stated or obvious from context, the term "or," as used herein, is understood to be inclusive.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 (as well as fractions thereof unless the context clearly dictates otherwise).

BRIEF DESCRIPTION OF THE DRAWINGS

For a fuller understanding of the nature and desired objects of the present invention, reference is made to the following detailed description taken in conjunction with the accompanying drawing figures wherein like reference characters denote corresponding parts throughout the several views.

DETAILED DESCRIPTION OF THE INVENTION

The present disclosure describes systems and methods for monitoring athletic equipment. Although described herein in the context of American football, embodiments of the invention can be applied to a variety of sports. For example, the RFID tags can be placed in (or on) basketballs, baseballs, softballs, kickballs, rugby balls, hand balls, polo balls, water-polo, volleyballs, tennis balls, shuttlecocks, racquetballs, squash balls, table-tennis balls, hockey pucks, soccer balls, lacrosse balls, field-hockey balls, golf balls, cricket balls, racecar bumpers, boat (e.g., racing shell) hulls, and the like.

Figure 1A:
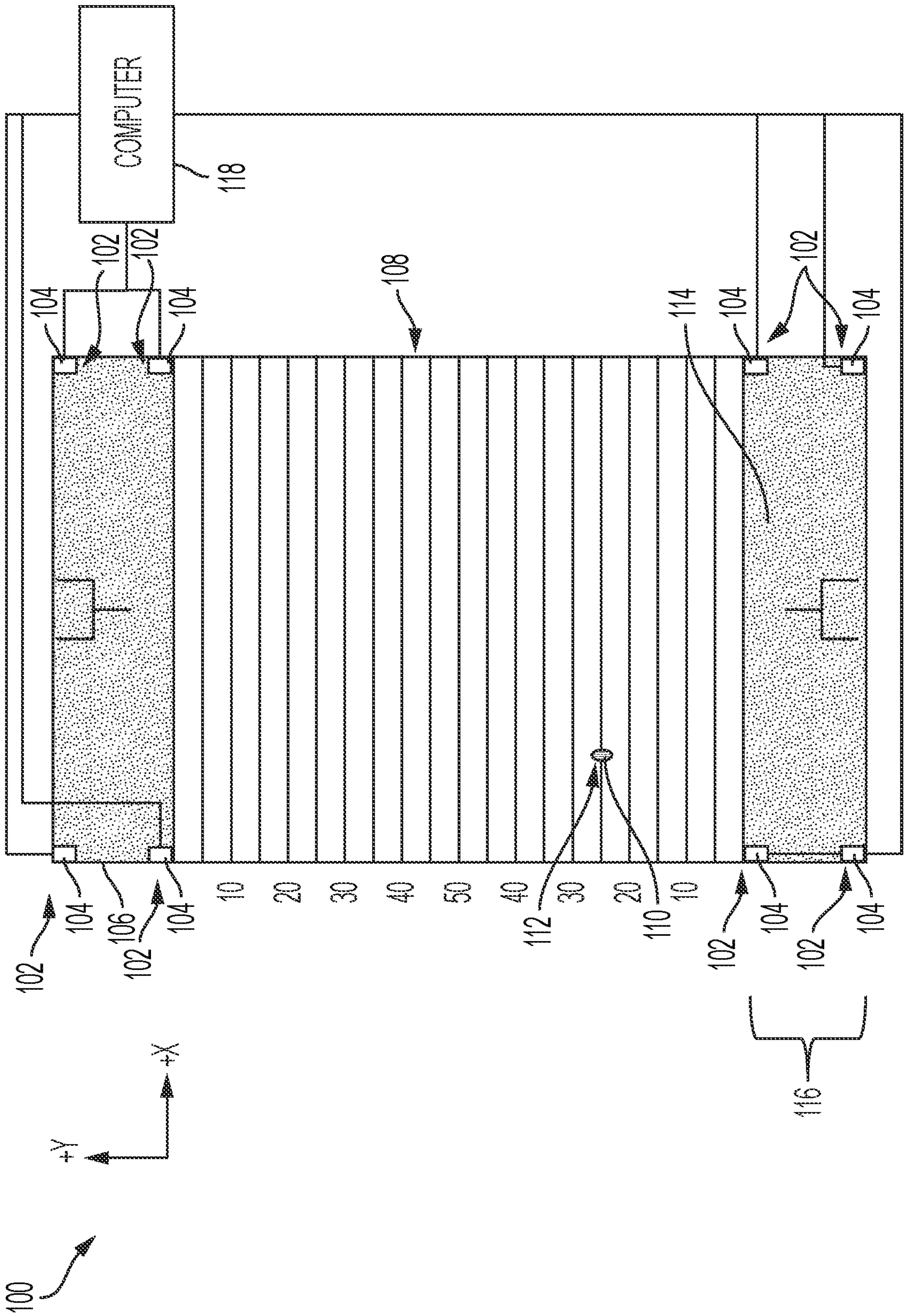
FIGS. 1A-1B illustrate a system for monitoring athletic equipment, in accordance with certain exemplary embodiments of the present disclosure.
Figure 1B:
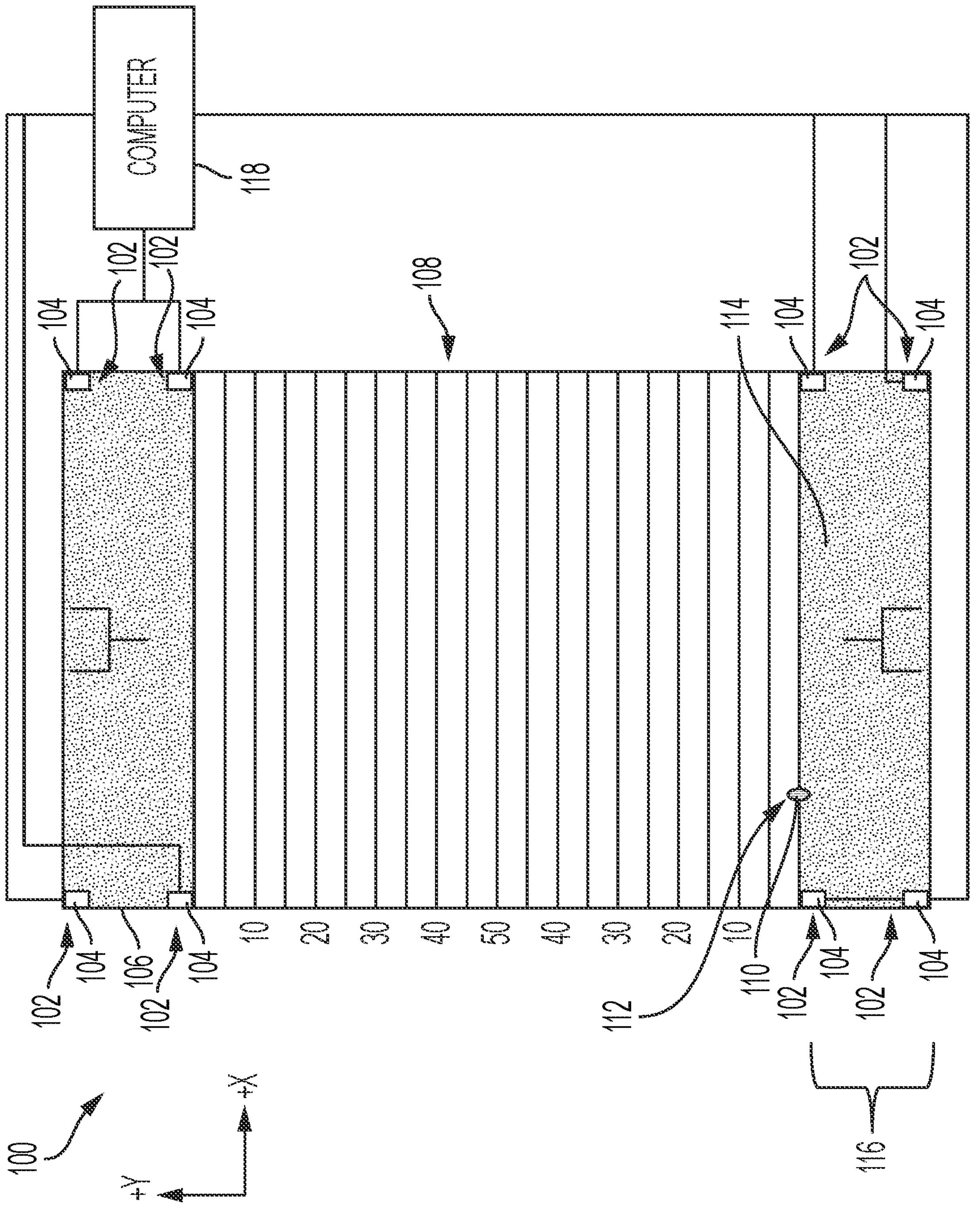

Certain embodiments of the present disclosure can be best described in connection with the various drawings. Referring now to FIGS. 1A-1B, a system 100 for monitoring athletic equipment is illustrated. System 100 is illustrated including a plurality of antennae 102 positioned around edges 106 of a field 108. The plurality of antennae 102 are illustrated disposed on a respective fixed structure 104. In the application illustrated in FIGS. 1A-1B (i.e., American football), the plurality of fixed structures are pylons. Each of the plurality of antennae 102 can be attached on or embedded within each pylon. Each antenna 102 can be configured and adapted to read radio frequency identifications (RFID) within a defined zone. For example, each antenna 102 can be configured to read an RFID tag 110 disposed on (or within) a sports ball 112 (e.g., a football or an American football). In certain embodiments, RFID tag 110 is integrated into (or embedded within) a stamped marking. In other embodiments, RFID tag 110 can be integrated into an adhesive or paint prior to being integrated into the stamped marking. In certain embodiments, a plurality of RFID tags 110 can be embedded within a football and positioned along a plurality of outer dimensions of the football. As illustrated in the exemplary application of FIG. 1B, the plurality of antennae 102 can be configured to detect RFID tag 110 when it crosses over a demarcation line 114 (e.g., an endzone line) into zone 116 (e.g., an endzone).

System 100 is also illustrated including a computer 118. Computer 118 is illustrated in communication with each antenna 102 of the plurality of antennae 102. Computer 118 can be a computer network system, a singular computing device, and the like. Computer 118 can be preprogramed with a database defining the dimensions of field 108. Computer 118 can be configured and adapted to process a signal from one or more antenna 102 of the plurality of antennae 102 in connection with the database to determine a position (i.e., with respect to the dimensions of field 108) and/or time data associated with an RFID tag 110. Such positional information is useful to collect statistical information and/or aid referees in determining when certain events are satisfied or triggered (e.g., when a ball crosses a line such that a touchdown occurs or the ball is out of bounds). Such information is also useful in determining the location of forward progress; when the ball changes direction; the location of the ball before, during, or after a call (e.g., out of bounds call, first down call, while the ball is under pile of players, etc.); possession decisions of complete or incomplete pass (e.g., boundary, ground, etc.); correlated location with a video or the game clock; the automatic yard marker (and 10 yard first down set up); the location in a fumble scramble; the location in the air (e.g., over goal posts, punts, etc.); relocation of ball after incomplete passes, call back regarding a penalty, downing a ball, or a quarter change; occurrences of out of bounds, illegal motions, or a point of a player as related to certain penalties; where cameras should be directed in connection with the ball path; and other information which may aid referees to make more accurate calls and determinations.

System 100 can include a display (e.g., attached to computer 118, in communication with computer 118, etc.). The display can include an event dashboard (see GUI of FIG. 3). Computer 118 can be configured and adapted to collect and combine data from the plurality of antennae 102.

In certain embodiments, system 100 can include a plurality of remote computing devices attached to a fixed structure (e.g., a pylon, a goal post, a stud, etc.) on the field. The plurality of remote computing devices can be in electronic communication with each of the plurality of antennae. The plurality of remote computing devices can be configured to respond to an enrolled RFID tag.

In certain embodiments, each antenna 102 can include a remote computing device. Such remove computing devices can be small single-board computers (SBCs), such as a RASPBERRY PI® 3B computer. Each antenna can be configured to communicate with each other directly (e.g., using respective transceivers) or indirectly (e.g., using computer 118).

Although the RFID tag 110 is illustrated on a football, the invention is not so limited. RFID tag 110 can be disposed on, attached to, or embedded within various articles of athletic equipment (e.g., protective athletic equipment, helmets, jerseys, headbands, cleats, etc.).

Figure 1C:
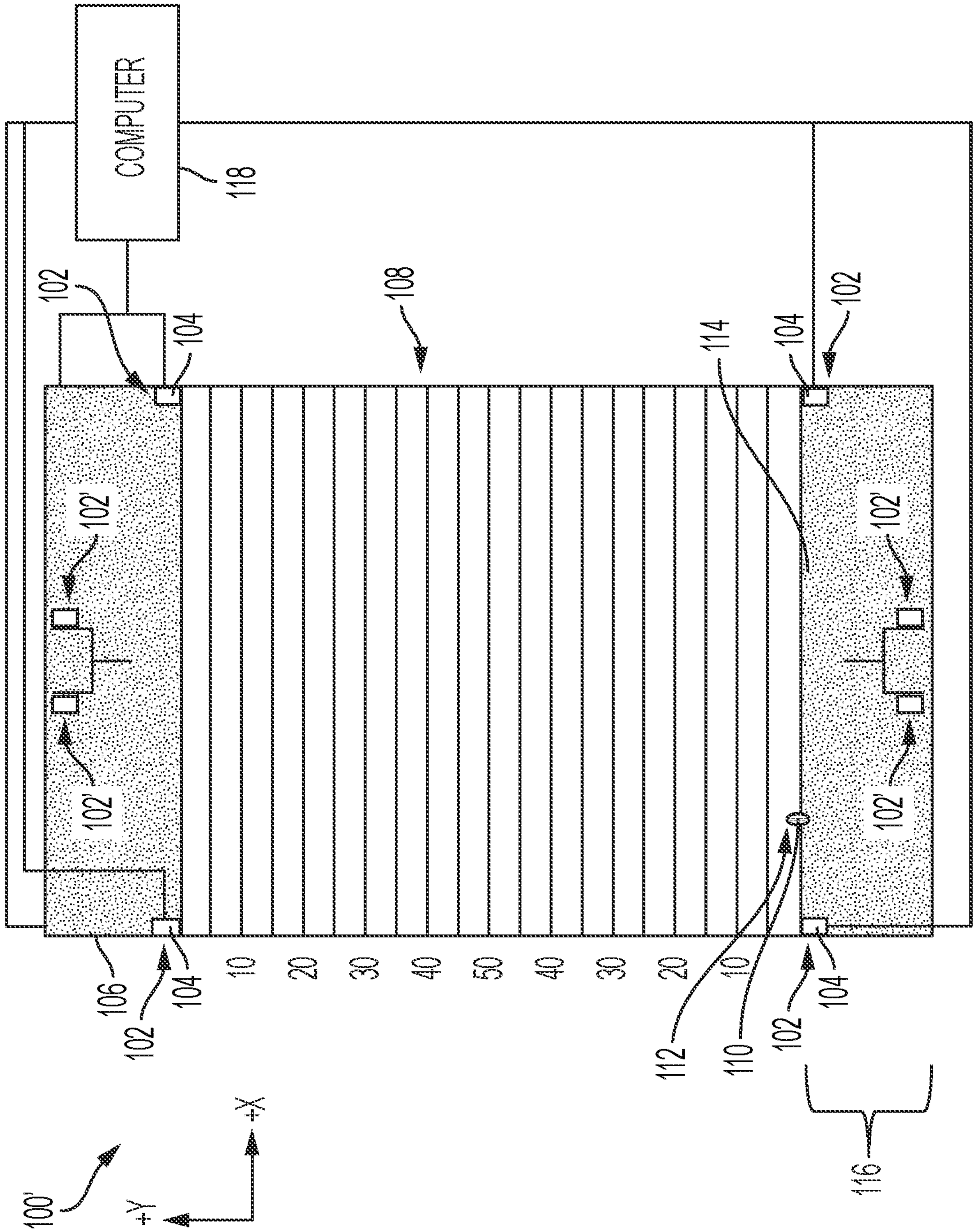
FIG. 1C illustrates a system for monitoring athletic equipment, in accordance with certain exemplary embodiments of the present disclosure.

FIG. 1C illustrates system 100'. System 100' is the substantially the same as system 100, except antennae 102' are attached to (or integrated with) the goal posts and only four antennae 102 are illustrated. Antennae 102' can be configured to have an angled zone of detection. Antennae 102' (e.g., VULCAN™ RFID LINE12 High Gain Antenna) can be configured to detect when an RFID-enabled device (e.g., a football) passes through the goal posts. Antennae 102' include an RFID reader (e.g., a ultra high frequency RFID reader, such as IMPINJ® SPEEDWAY® REVOLUTION™ R420 UHF RFID Reader (4 Port) (USA2M1)). System 100' illustrates four antennae 102, with one antenna 102 at each end of each goal line. It should be understood that the number of antennae 102 (including the number of RFID readers) is exemplary in nature. In certain embodiments, more than four antennae 102 (and RFID readers) can be used. In certain embodiments, less than four antennae 102 (and RFID readers) can be used.

Figure 2:
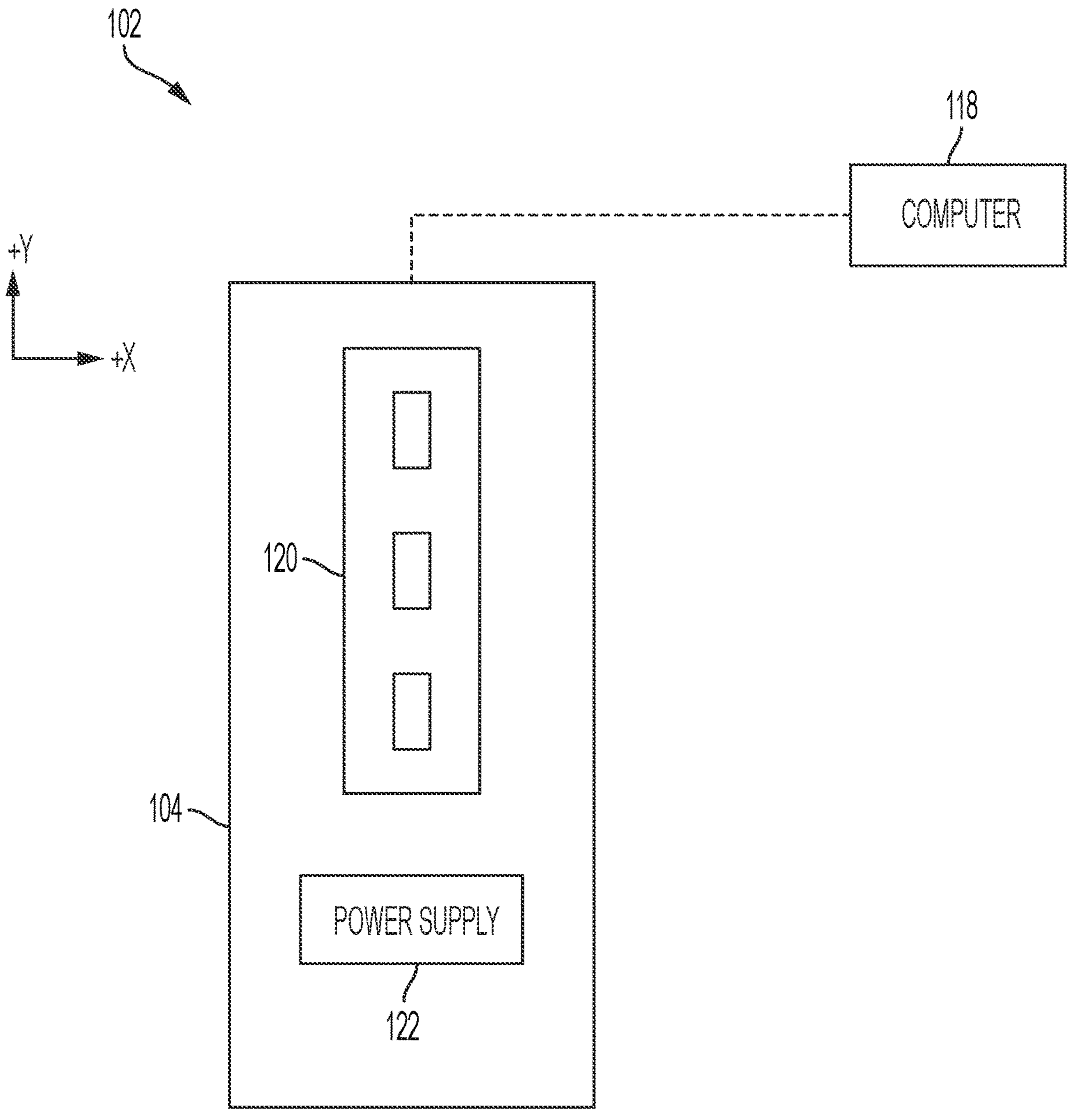
FIG. 2 illustrates a pylon used in connection with certain exemplary embodiments of the present disclosure.

Referring now to FIG. 2, an antenna 102 integrated into a fixed structure 104 (e.g., a goal pylon) is illustrated. Antenna 102 includes a RFID reader 120 (e.g., RFID RC522 Embedded 900 Megahertz high range RFID reader). Antenna 102 includes a power supply 122. Antenna 102 can include a remote computing device (e.g., an SBC such as those available under the RASPBERRY PI® mark, etc.). Antenna 102 and/or remote computing device can communicate with computer 118 and can be configured to read and/or write data (e.g., JSON objects) to a database of computer 118. Computer 118 can use a custom middleware server to mesh antenna/geo network map. Antenna 102 can also include an RS232 to TTL Converter.

Figure 3:
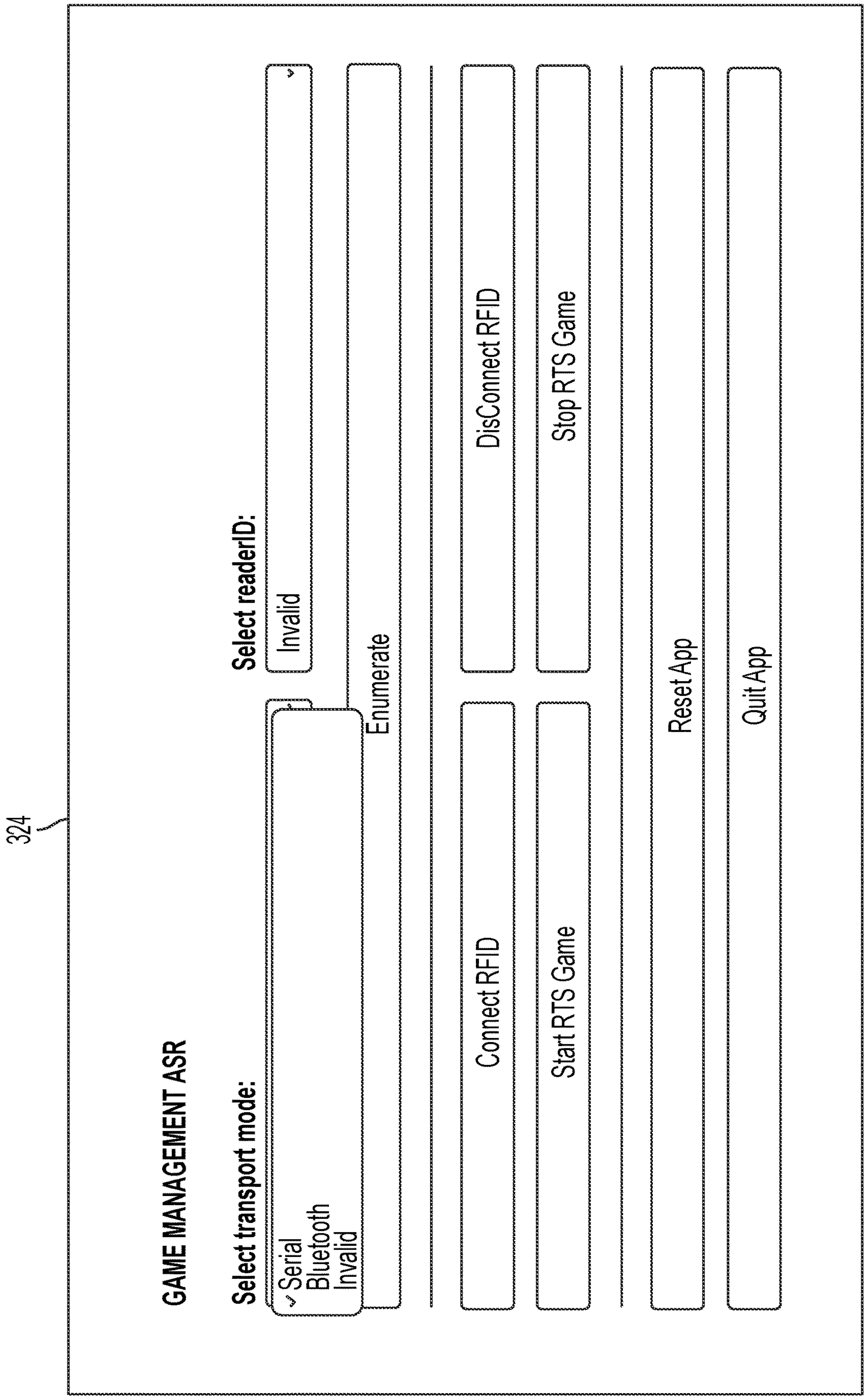
FIG. 3 illustrates a graphical user interface (GUI) used in connection with certain exemplary embodiments of the present disclosure.

FIG. 3 illustrates a graphical user interface (GUI) 324 of a display on an electronic communication device. Systems 100 and 100' can include an electronic communication device including a display and a graphical user interface (GUI), the display and GUI being configured and adapted to alert a user when a predefined event occurs. The electronic communication device (including the display and/or GUI 324) can be in electronic communication with computer 118. The electronic communication device, display and/or GUI 324 can be configured and adapted to alert a user when a predefined event occurs. In one example, the user can be a game official and the predefined event can be when the ball crosses over a goal line. GUI 324 can be described as a "dashboard" and can be configured to track a ball location (e.g., in real time) and have a "static event" defined. When the conditions of the static event are satisfied, the dashboard can be triggered to signal sound to a device (e.g., the electronic communication device, an earpiece, etc.) or tag (e.g., an RFID tag). The display, GUI, or another component of the electronic communication device can alert the game official of the occurrence of the event with a signal, such as a light, haptic, and/or sound alert.

Computer 118 and electronic communication device can be configured to receive input from an electronically activated handheld whistle as disclosed in U.S. Pat. No. 10,799,785. The electronically activated handheld whistle can include a transmitter (e.g., transmitting an electrically coded signal to start or stop a timekeeping clock) and a receiver (e.g., configured to receive a serialized pulse signal from the timekeeping clock). The handheld whistle can include a vane extending through the sidewall into a housing of the electronic whistle system and wherein the vane includes a pivoting shaft and an optical sensor.

Figure 4:
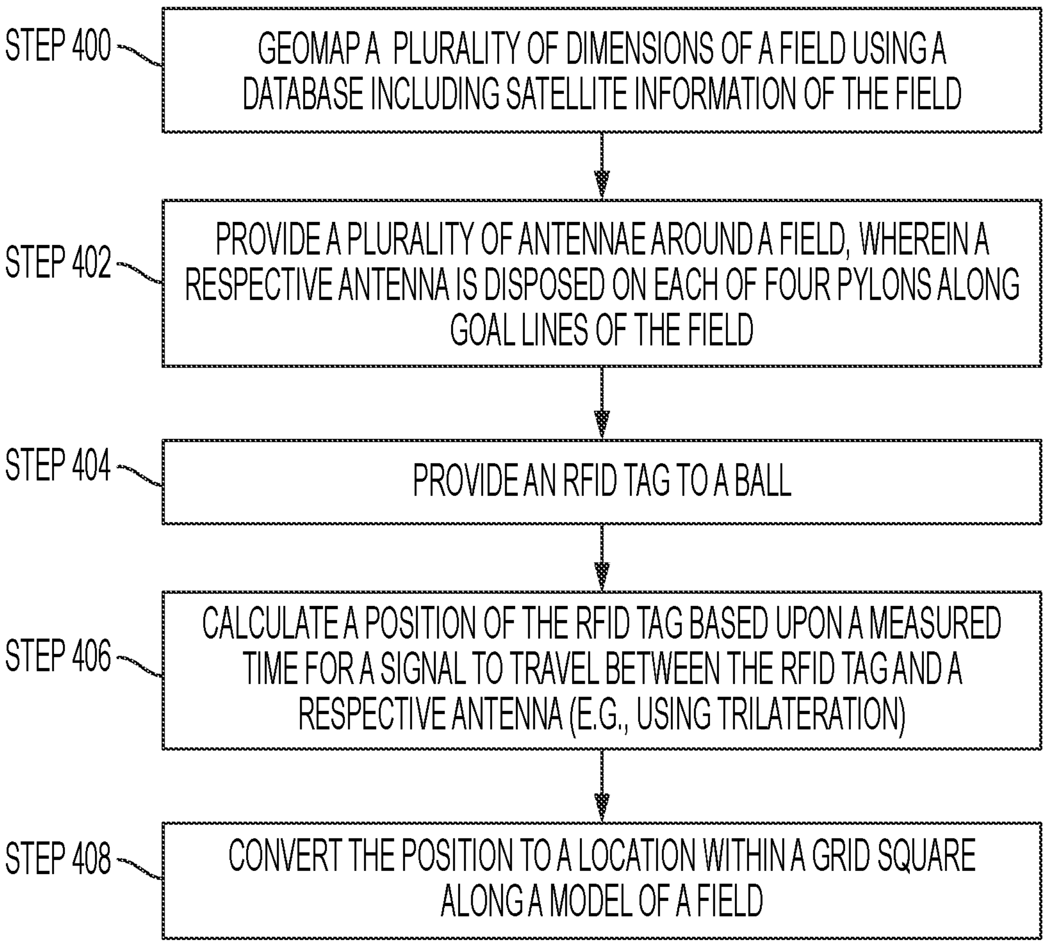
FIG. 4 illustrates a block diagram of a method of monitoring athletic equipment, in accordance with certain exemplary embodiments of the present disclosure.

FIG. 4 is a flow diagram in accordance with exemplary embodiments of the present invention. As is understood by those skilled in the art, certain steps included in the flow diagrams may be omitted; certain additional steps may be added; and the order of the steps may be altered from the order illustrated.

FIG. 4 illustrates a method of monitoring athletic equipment. At Step 400, a plurality of dimensions of a field are geomapped using a database including satellite information of the field. In one example, a custom JAVASCRIPT® library can be used to extract (e.g., "geocode") a football field using GOOGLE MAPS™ and/or GOOGLE CLOUD BIGQUERY™ API as JSON/GPS coordinates. A mesh can be created from satellite information; detected RFID signals can be used to correspond an RFID position with a geolocation/position of the mesh.

At Step 402, a plurality of antennae are provided around a field, wherein a respective antenna is disposed on each of four pylons along goal lines of the field. In certain embodiments, antennae can be provided in the back corners of the endzones (i.e., the distalmost portion of the endzone with respect to the center of the field). In certain other embodiments, antennae are not provided in the back corners of the endzones. In one example, RFID and/or RASPBERRY PI® antennas can be embedded in goal pylons to capture "smart labels" or RFID tags attached to a football.

At Step 404, an RFID tag (or "smart label") is provided to (e.g., within or on) a ball. RFID tags (or "smart labels") can be ultra-thin RFID tags that are small and thin enough to be laminated between layers of paper or plastic. Such RFID tags can be low cost, consumable labels (or stickers, tickets and documents) with an integral read/write memory which can be embedded into a football. Certain active or passive RFID tags can be used to build an accurate real-time location system (RTLS).

At Step 406, a position of the RFID tag is calculated based upon a measured time for a signal to travel between the RFID tag and a respective antenna (e.g., using trilateration, triangulation, etc.). At this step (or before this step), an antenna (or microcontroller of an antenna) provides data through an SPI protocol. An electromagnetic field (e.g., 900 Mhz) is created and used to communicate with RFID tags. Certain scripts (e.g., PYTHON® scripts) can be used to interact with (e.g., read or write) an RFID chip. Real-time data can be exported from RASPBERRY PI® devices to generate a timestamp of events.

At Step 408, the position is converted to a location within a grid square along a model of a field. Graphics of positions and/or events of the ball on the field can be generated and displayed.

EQUIVALENTS

Although preferred embodiments of the invention have been described using specific terms, such description is for illustrative purposes only, and it is to be understood that changes and variations may be made without departing from the spirit or scope of the following claims.

INCORPORATION BY REFERENCE

The entire contents of all patents, published patent applications, and other references cited herein are hereby expressly incorporated herein in their entireties by reference. Specifically, U.S. Pat. No. 11,000,751 (entitled: "GAME BALL LOCATING SYSTEM") and U.S. Pat. No. 10,799,785 (entitled: "EWHISTLE") are incorporated herein by reference.

The invention claimed is:

1. A system for monitoring athletic equipment, comprising:

a plurality of antennae positioned around edges of a field, wherein a respective antenna is disposed on each of four pylons along goal lines of the field, and wherein each antenna is configured and adapted to read radio frequency identifications (RFID) within a defined zone;

an RFID tag attached to an article of athletic equipment; and a computer in communication with each antenna of the plurality of antennae, the computer being preprogramed with a database defining dimensions of the field, the computer being configured and adapted to process a signal from one or more antenna of the plurality of antenna in connection with the database to determine a position of the RFID tag.

2. The system of claim 1, wherein the RFID tag is embedded within a sports ball.

3. The system of claim 2, wherein the sports ball is a football.

4. The system of claim 3, wherein the RFID tag is integrated into a stamped marking.

5. The system of claim 4, wherein the RFID tag is integrated into an adhesive or paint prior to being integrated into the stamped marking.

6. The system of claim 2, wherein the computer is programmed to determine whether any portion of the football crosses a specified demarcation line.

7. The system of claim 6, wherein the computer is programmed to receive geometric dimensions of the football and positional information of the RFID with respect to the geometric dimensions of the football.

8. The system of claim 1, wherein the database includes a plurality of JSON objects derived from global positioning system (GPS) data of the field.

9. The system of claim 1, further comprising:

a display including an event dashboard, wherein the computer is configured and adapted to collect and combine data from the plurality of antennae.

10. The system of claim 9, further comprising:

a plurality of remote computing devices attached to a fixed structure on the field, wherein the plurality of remote computing devices are in electronic communication with each of the plurality of antennae, wherein the plurality of remote computing devices are configurable to respond to an enrolled RFID tag.

11. The system of claim 1, wherein the computer is configured and adapted to determine an event, the computer being further configured to provide an output signal based on the event.

12. A system for monitoring athletic equipment, comprising:

a plurality of antennae positioned around edges of a field, wherein a respective antenna is disposed on each of four pylons along goal lines of the field, and wherein each antenna is configured and adapted to read radio frequency identifications (RFID) within a defined zone;

a plurality of RFID tags attached to a football, wherein the plurality of RFID tags are positioned along a plurality of outer dimensions of the football; and a computer in communication with each antenna of the plurality of antennae, the computer being preprogramed with a database including a plurality of data objects defining dimensions of the field, the computer being configured and adapted to process a signal from one or more antenna of the plurality of antenna in connection with the database to determine a position of the football.

13. The system of claim 12, wherein the plurality of RFID tags includes a primary RFID tag.

14. The system of claim 13, wherein the primary RFID tag is located in a central location.

15. The system of claim 12, wherein the plurality of RFID tags includes:

a first RFID tag located at a first longitudinal end;

a second RFID tag located at a second longitudinal end; and a subset of RFID tags located circumferentially around a central portion of the football.

16. The system of claim 12, further comprising an electronic communication device including a display and a graphical user interface (GUI), the display and GUI being configured and adapted to alert a user when a predefined event occurs.

17. The system of claim 16, wherein the computer and the electronic communication device are configured to receive input from an electronically activated handheld whistle, the electronically activated handheld whistle including a transmitter transmitting an electrically coded signal to start or stop a timekeeping clock and a receiver is configured to receive a serialized pulse signal from the timekeeping clock and wherein the handheld whistle includes a vane extending through the sidewall into the housing of the electronic whistle system and wherein the vane includes a pivoting shaft and an optical sensor.

18. A method of monitoring athletic equipment comprising:

geomapping a plurality of dimensions of a field using a database including satellite information of the field;

providing a plurality of antennae around a field, wherein a respective antenna is disposed on each of four pylons along goal lines of the field;

providing an RFID tag to a ball;

calculating a position of the RFID tag based upon a measured time for a signal to travel between the RFID tag and a respective antenna using trilateration; and converting the position to a location within a grid square along a model of a field.

* * * * *